United States Patent
Inoue et al.

(10) Patent No.: US 9,570,995 B2
(45) Date of Patent: Feb. 14, 2017

(54) MAGNETICALLY COUPLED REACTOR AND POWER CONVERTER

(71) Applicant: Toyota Jidosha Kabushiki Kaisha, Toyota-shi Aichi-ken (JP)

(72) Inventors: Shuntaro Inoue, Nagakute (JP);
Kenichi Takagi, Nagakute (JP);
Takahide Sugiyama, Nagakute (JP);
Masaru Sugai, Nagakute (JP);
Kenichiro Nagashita, Toyota (JP);
Fumiki Tanahashi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/848,910

(22) Filed: Sep. 9, 2015

(65) Prior Publication Data

US 2016/0079873 A1    Mar. 17, 2016

(30) Foreign Application Priority Data

Sep. 17, 2014    (JP) ................ 2014-189264

(51) Int. Cl.
*H02M 3/335* (2006.01)
*H01F 27/245* (2006.01)
(Continued)

(52) U.S. Cl.
CPC ....... *H02M 3/33546* (2013.01); *H01F 27/245* (2013.01); *H01F 27/2823* (2013.01);
(Continued)

(58) Field of Classification Search
CPC ........ H01F 27/08; H01F 27/06; H01F 17/043;
H01F 17/04; H01F 27/362; H01F 27/36;
H01F 27/30; H01F 27/32; H01F 27/324;
H01F 27/24; H01F 27/28; H01F 27/365;
H02M 3/22; H02M 3/24; H02M 3/33569;
H02M 5/45; H02M 5/451; H02M 5/458
(Continued)

(56) References Cited

U.S. PATENT DOCUMENTS 4,209,732 A * 6/1980 Smith .................. H04N 3/1856
                                                    315/400
5,804,928 A * 9/1998 Endo ...................... H04N 3/237
                                                    315/371
(Continued)

FOREIGN PATENT DOCUMENTS

JP    2003-234220 A    8/2003
JP    2009-284647 A    12/2009
(Continued)

*Primary Examiner* — Adolf Berhane
(74) *Attorney, Agent, or Firm* — Dinsmore & Shohl LLP

(57) ABSTRACT

A magnetically coupled reactor includes a coupled core member, a first coil, and a second coil. The coupled core member includes a first core and a second core made of a magnetic material and disposed to face each other, a coil channel, and a sheet-like magnetic body by which a coupling portion between cores is put between the first core and the second core at an outer portion of the first and second cores. Each coil is wound around a leg through the coil channel in a lap winding manner such that the coils are overlapped on top of each other in the coil channel when seen in an axial direction. The sheet-like magnetic body extends from the coupling portion between coils into the coil channel and includes a portion arranged between coils located between the coils in the axial direction.

7 Claims, 11 Drawing Sheets

(51) Int. Cl.
*H01F 27/28* (2006.01)
*H02M 3/158* (2006.01)
*H02M 3/337* (2006.01)
*H02M 1/00* (2006.01)
*H02M 1/12* (2006.01)

(52) U.S. Cl.
CPC ....... *H02M 3/158* (2013.01); *H02M 3/33584* (2013.01); *H02M 3/3372* (2013.01); *H02M 2001/009* (2013.01); *H02M 2001/123* (2013.01)

(58) Field of Classification Search
USPC ... 336/60, 65, 83, 84 C, 196, 214, 221, 232; 363/15, 17, 37
See application file for complete search history.

(56) References Cited

U.S. PATENT DOCUMENTS

| | | | | |
|---|---|---|---|---|
| 6,611,187 B2* | 8/2003 | Matsumoto | ........... | H01F 1/0552 336/110 |
| 7,893,804 B2* | 2/2011 | Kaveh Ahangar | ...... | H01F 27/10 336/60 |
| 8,102,228 B2* | 1/2012 | Okamoto | ............. | H01F 27/266 336/209 |
| 8,379,417 B2* | 2/2013 | Xiao | ......................... | H01F 3/12 336/84 C |
| 8,400,246 B2* | 3/2013 | Ono | .................... | H01F 27/2852 336/192 |
| 8,618,899 B2* | 12/2013 | Inaba | ...................... | H01F 27/22 336/55 |
| 8,717,133 B2* | 5/2014 | Ooishi | .................... | H01F 27/22 336/55 |
| 8,730,001 B2* | 5/2014 | Yoshikawa | ........... | H01F 27/306 336/178 |
| 2002/0159277 A1* | 10/2002 | Matsumoto | ........... | H01F 1/0552 363/21.04 |
| 2007/0046270 A1* | 3/2007 | Tsuruya | .............. | H02M 3/1582 323/247 |
| 2009/0289751 A1 | 11/2009 | Nagano et al. | | |
| 2013/0200697 A1* | 8/2013 | Fukushige | .......... | B60L 11/1803 307/10.1 |
| 2015/0085533 A1 | 3/2015 | Tanahashi | | |
| 2015/0302981 A1 | 10/2015 | Kaneko et al. | | |

FOREIGN PATENT DOCUMENTS

| | | |
|---|---|---|
| JP | 2013-093921 A | 5/2013 |
| JP | 2013-172135 A | 9/2013 |
| JP | 2014-078577 A | 5/2014 |
| JP | 2015-065346 A | 4/2015 |

* cited by examiner

MAGNETICALLY COUPLED REACTOR AND POWER CONVERTER

PRIORITY INFORMATION

This application claims priority to Japanese Patent Application No. 2014-189264 filed on Sep. 17, 2014, which is incorporated herein by reference in its entirety.

BACKGROUND

Technical Field

The present invention relates to a magnetically coupled reactor and a power converter including the magnetically coupled reactor. The magnetically coupled reactor includes a coupled core member having a first core and a second core. The magnetically coupled reactor also includes a first coil and a second coil that are wound around legs of the coupled core member.

Related Art

There are cases where it is desired to decrease leakage magnetic flux in a magnetically coupled reactor by increasing the degree of magnetic coupling. To this end, a technique such as disclosed in JP 2009-284647 A has been conceived.

JP 2009-284647 A has disclosed a magnetically coupled reactor formed by two outer cores and an inner core disposed between the two outer cores. Two coils are wound around the outer cores and the inner core. One of the two coils is wound around one of the outer cores and the inner core, while the other coil is wound around the other of the two outer cores and the inner core. The coils are partly overlapped alternately to form a lap-winding portion, and the lap-winding portion is then disposed around the inner core.

During the use of the magnetically coupled reactor, a negative-phase-sequence current that flows in a reverse direction may flow through the two coils. In this case, magnetic flux is generated in both coils and becomes intensified at portions where the two coils face each other, which therefore may cause an increase of Joule loss. If the lap-winding portion is formed as in the structure of JP 2009-284647 A, the Joule loss could be decreased. However, such a structure may require new cores at both ends in a direction orthogonal to the axial direction of the coils, and extended windings to be wound around the two cores also become necessary. As a result of this, the size of the structure is increased. Therefore, in a power converter, improvement is desired from the view point of miniaturizing the structure in which a voltage converting operation can be performed using the leakage inductance without excessively suppressing the leakage inductance.

SUMMARY OF THE INVENTION

An object of the present invention is to provide a magnetically coupled reactor and a power converter in which the magnetically coupled reactor is capable of decreasing Joule loss without excessively increasing the size of the reactor when a negative-phase-sequence current flows through two coils, while preventing an excessive increase of a coupling coefficient.

A magnetically coupled reactor according to an embodiment of the present invention includes a coupled core member and first and second coils. The coupled core member includes a first core and a second core made of magnetic materials and arranged to face each other, a coil channel formed by a recess formed between two legs on a side facing the first core and the second core, and a sheet-like magnetic body by which a coupling portion between cores is put between the first core and the second core on a peripheral side at an outer portion formed by one of the two legs. The first and second coils pass through the coil channel and are wound around the other of the two legs. The first and second coils are overlapped alternately in the coil channel when seen in an axial direction. The sheet-like magnetic body has a portion arranged between coils that extends from the coupling portion between cores into the coil channel and is arranged between the first and second coils in the axial direction.

A power converter according to an embodiment of the present invention includes a primary circuit and a secondary circuit magnetically coupled to the primary circuit via a voltage converter. The primary circuit or the secondary circuit includes a first arm, a second arm, and a magnetically coupled reactor according to the embodiment of the present invention. The first arm includes two first switching elements connected in series with each other, and the second arm includes two second switching elements connected in series with each other. One end of a first coil is connected between the two first switching elements in the first arm, while one end of a second coil is connected between the two second switching elements in the second arm. The other ends of the first and second coils are connected to both ends of a voltage converting coil that constitutes the voltage converter on the primary circuit side, and the power converter is used in a state where a negative-phase-sequence current flows through the first and second coils.

The magnetically coupled reactor and the power converter according to the embodiment of the present invention are capable of preventing an excessive increase in size, decreasing the Joule loss when the reverse-phase-sequence current flows through the two coils, and preventing an excessive increase of the coupling coefficient.

DESCRIPTION OF EXEMPLARY EMBODIMENTS

Figure 1:
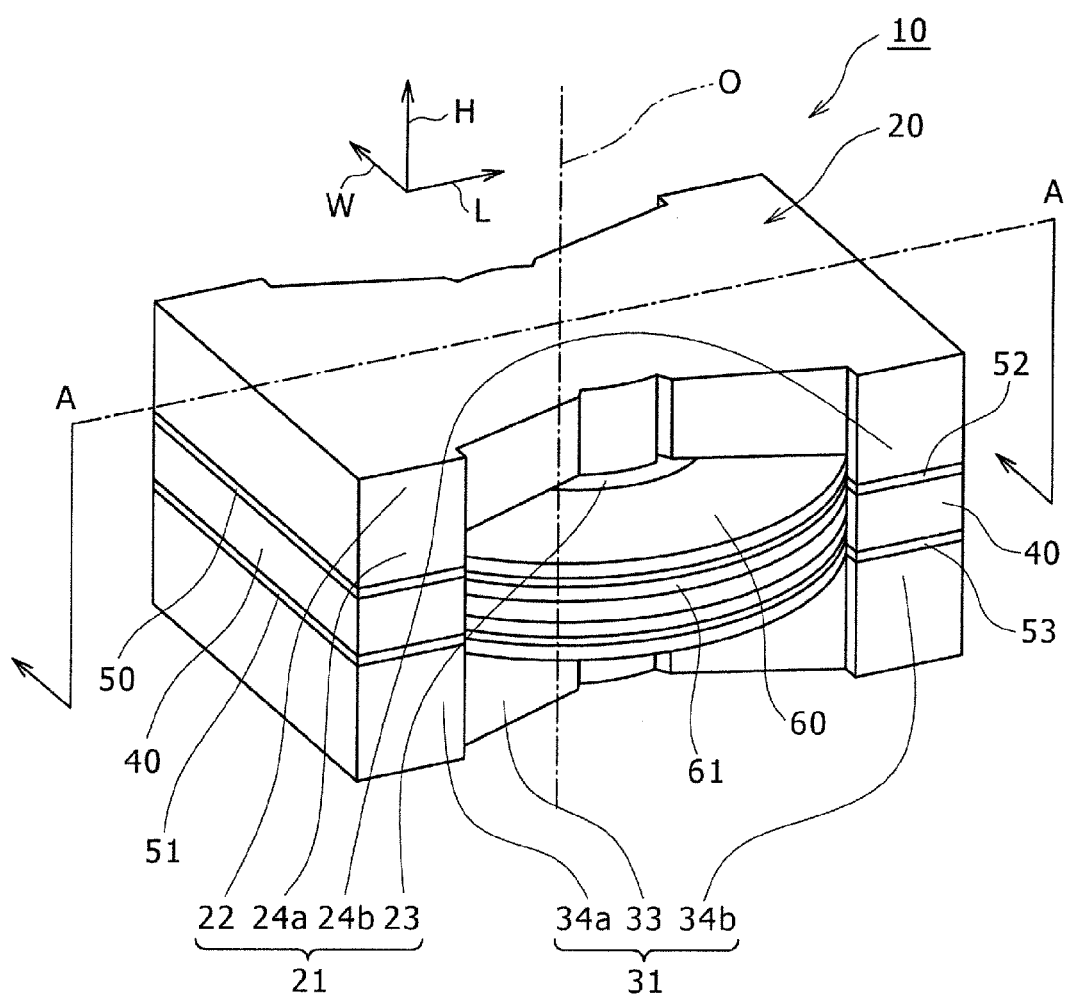
FIG. 1 is a perspective view illustrating a magnetically coupled reactor according to an embodiment of the present invention.

Embodiments of the present invention will be described in detail below with reference to the accompanying drawings. Various shapes, materials, quantities, and so on as indicated in the following description will be presented by way of example only, and may be changed in accordance with the specification of a magnetically coupled reactor. In the description below, similar elements will be indicated by the same reference numerals.

Figure 2:
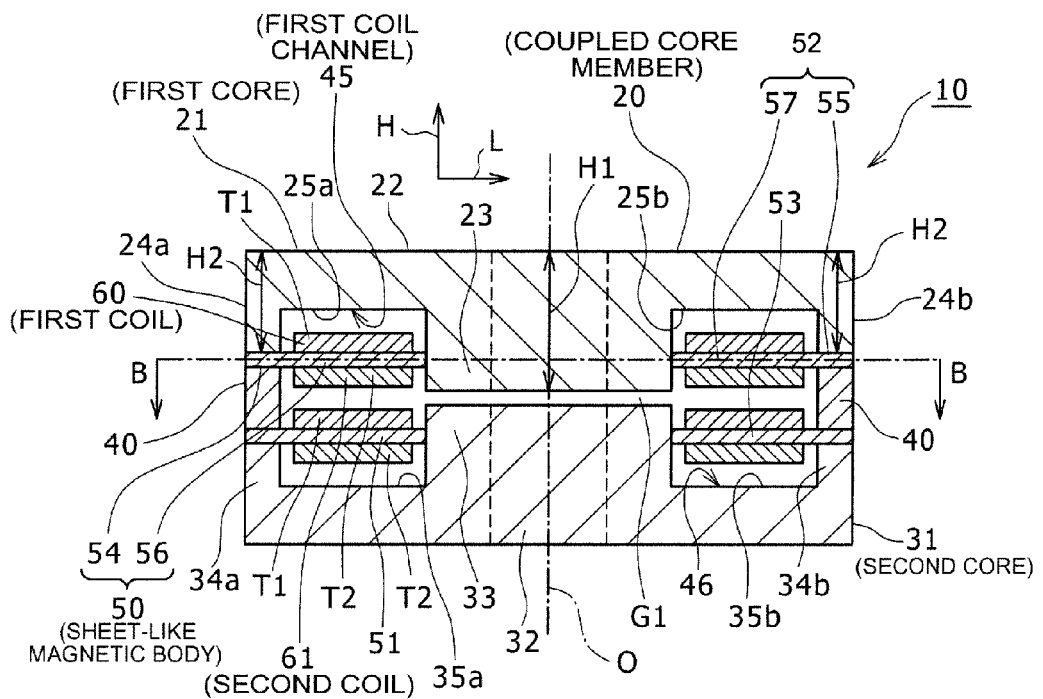
FIG. 2 is a cross-sectional view cut along line A-A of FIG. 1.

FIG. 1 is a perspective view illustrating a magnetically coupled reactor 10 of the present embodiment. FIG. 2 is a cross-sectional view of FIG. 1 cut along line A-A, and FIG. 3 is a cross-sectional view of FIG. 2 cut along line B-B.

The magnetically coupled reactor 10 includes a coupled core member 20 and first and second coils 60, 61. The coupled core member 20 includes a first core 21, a second core 31, two intermediate cores 40, two first sheet-like magnetic bodies 50, 51, and two second sheet-like magnetic bodies 52, 53. The coupled core member 20 is formed by integrally coupling the first core 21, the second core 31, the intermediate cores 40, and the sheet-like magnetic bodies 50, 51, 52, 53. The coupled core member 20 also includes a first coil channel 45 and a second coil channel 46 which will be described later.

Figure 3:
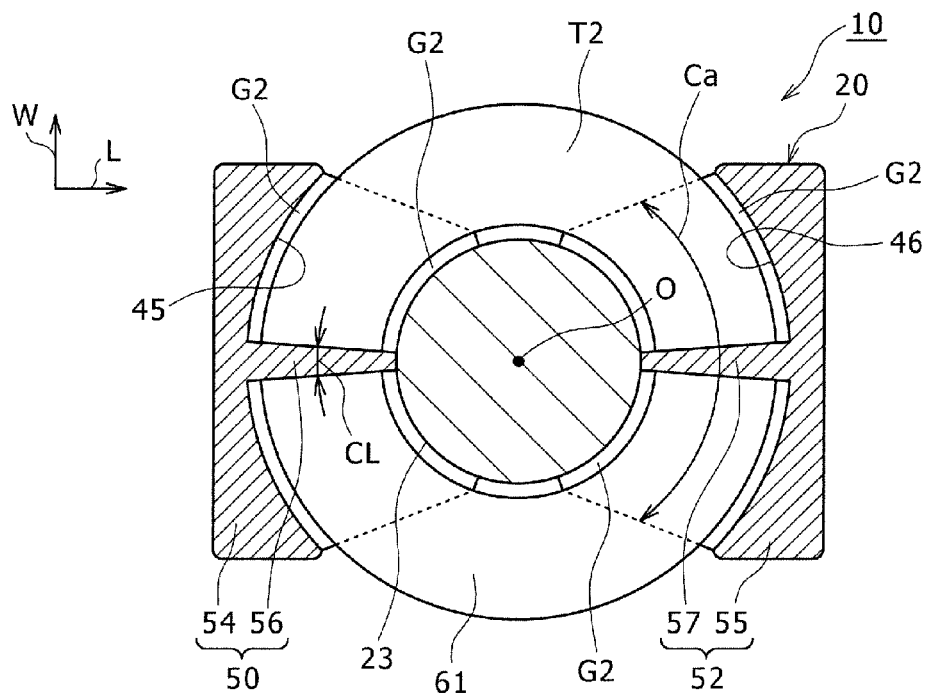
FIG. 3 is a cross-sectional view cut along line B-B of FIG. 2.

In FIGS. 1 to 3, three directions orthogonal to one another of the coupled core member 20, that is a height direction, a length direction, and a width direction are indicated by H, L, and W. The height direction H is identical to a direction of a central axis O running axially in coils 60, 61 and the coupled core member 20, which will be described later.

The first core 21 has a base 22, an inner leg 23, an outer end leg 24a, and a second outer end leg 24b. The base 22 is formed like a plate having the shape of a bow-tie when seen in the height direction H. The inner leg 23 protrudes from a mid-portion of the base 22 in a length direction L on the surface of one side (lower side of FIG. 1) of the base 22 in the height direction H. The two end legs 24a, 24b protrude from both ends of the base 22 in the length direction L on the surface of one side of the base 22 in the height direction H.

The inner leg 23 is formed in a cylindrical shape about the central axis O. The end legs 24a, 24b have rectangular cross-sections and are formed in a curved shape with their inner surfaces on the inner leg 23 side being recessed arcuately. A height H1 of the inner leg 23 is larger than a height H2 of the end legs 24a, 24b. A recess 25a is formed between the outer end leg 24a and the inner leg 23 on the surface of one side of the base 22 in the height direction H. A second recess 25b is formed between the second outer end leg 24b and the inner leg 23 on the surface of one side (lower side of FIG. 2) of the base 22 in the height direction H. The two recesses 25a, 25b are formed arcuately on the same circumference. The second core 31 includes a base 32, an inner leg 33, an outer end leg 34a, and a second outer end leg 34b. The second core 31 is formed in the same manner as the first core 21. Similar to the recess 25a and the second recess 25b, a recess 35a and a second recess 35b are formed on the surface of the other side (upper side of FIG. 2) of the base 32 in the height direction H.

The first and second cores 21, 31 are arranged to face each other in the height direction H on both sides of the coupled core member 20 in the height direction H. The first and second cores 21, 31 are arranged such that the end legs 24a, 24b face the end legs 34a, 34b and inner leg 23 faces the inner leg 33. As will be described later, two first sheet-like magnetic bodies 50, 51 and the intermediate core 40 are put between the outer end legs 24a, 34a arranged on one side (left side of FIG. 2) of the coupled core member 20 in the length direction L. Two second sheet-like magnetic bodies 52, 53 and the intermediate core 40 are put between the second outer end legs 24b, 34b arranged on the other side (right side of FIG. 2) of the coupled core member 20 in the length direction L. A gap G1 is formed in the height direction H between tip ends of the inner legs 23, 33 of the cores 21, 31. The first and second sheet-like magnetic bodies 50, 52 are arranged on the upper side of FIG. 2, while the first and second sheet-like magnetic bodies 51, 53 are arranged on the lower side of FIG. 2.

The intermediate core 40 is arranged between the two sheet-like magnetic bodies 50, 51 (or 52, 53) in the height direction H. The intermediate core 40 is formed in a block shape having the same cross-section as the end legs 24a, 24b and 34a, 34b of the cores 21, 31. The intermediate core 40 has a cuboid shape with its inner periphery side notched to face the outer periphery of the second coil 61.

The first core 21, the second core 31, and the intermediate cores 40 are made of a magnetic material, such as iron or steel which is a metal having a magnetic property. The first core 21 may be formed by pressure molding of a mixed material made of magnetic powder and a resin binder.

The sheet-like magnetic bodies 50, 51, 52, 53 are formed in thin plate-like sheets made of a magnetic material, such as iron or steel. Each of the first sheet-like magnetic bodies 50, 51 includes a coupling portion 54 between cores and a portion 56 arranged between coils, which will be described later. Each of the second sheet-like magnetic bodies 52, 53 includes a second coupling portion 55 between cores and a second portion 57 arranged between coils, which will also be described later.

The coupling portions 54 between cores on the periphery side of the first sheet-like magnetic bodies 50, 51 are put between one end of each of the first and second cores 21, 31 in the length direction L via the intermediate core 40 located at one end in the length direction L. The second coupling portions 55 between cores on the periphery side of the second sheet-like magnetic bodies 52, 53 are put between the other end of each of the first and second cores 21, 31 in the length direction L via the intermediate core 40 located at the other end in the length direction L. The coupling portions 54, 55 between cores have the same cross-sections as the end legs 24a, 24b, 34a, 34b.

A first coil channel 45 is formed on one side of the coupled core member 20 in the length direction L. A second coil channel 46 is formed on the other side of the coupled core member 20 in the length direction L. The first coil channel 45 is formed by a portion including the recesses 25a, 35a formed between the inner legs 23, 33 and the outer end legs 24a, 34a on a side facing the bases 22, 32 of the cores 21, 31, and the inner side surface of the intermediate core 40. The second coil channel 46 is formed by a portion including the second recesses 25b, 35b formed between the inner legs 23, 33 and the second outer end legs 24b, 34b on a side facing the bases 22, 32 of the cores 21, 31, and the inner side surface of the intermediate core 40. The surfaces of facing each other of the bases 22, 32 are the inner side surfaces. Therefore, the coupling portions 54 between cores of the first sheet-like magnetic bodies 50, 51 are put between one end (leftmost portion of FIG. 2) of each of the first and second cores 21, 31 in the length direction L. The one end of the first and second cores 21, 31 in the length direction L are outer portions formed by the outer end legs 24a, 34a and one intermediate core 40 (on the left side of FIG. 2). The outer end legs 24a, 34a are one leg of each of the outer end legs 24a, 34a and the inner legs 23, 33 of the cores 21, 31, while the inner legs 23, 33 are the other legs. The second coupling portions 55 between cores of the second sheet-like magnetic bodies 52, 53 are put between the other ends (rightmost portion of FIG. 2) of the first and second cores 21, 31 in the length direction L. The other ends of the first and second cores 21, 31 in the length direction L are second outer portions formed by the second outer end legs 24b, 34b and the other intermediate core 40 (on the right side of FIG. 2).

As illustrated in FIG. 3, each of the coil channels 45, 46 is part of a circle having a width in a radial direction about the central axis O when cut along a direction orthogonal to the height direction H. Accordingly, when the circular coils 60, 61 are arranged in the coil channels 45, 46, respectively, as will be described later, a gap G2 between the wall surfaces of the coil channels 45, 46 and the inner and outer peripheries of the coils 60, 61 can be made to be substantially uniform along the length of the coil channels 45, 46. Leakage flux, therefore, to be leaked in the gap G2 due to the current flow in the coils 60, 61, can be easily adjusted.

The portions 56, 57 arranged between coils of the sheet-like magnetic bodies 50, 51, 52, 53 extend into the coil channel 45 (or 46) from the coupling portions 54, 55 between coils. The portions 56, 57 arranged between coils are formed in a triangle shape or an arcuate shape. Tip end surfaces of the portions 56, 57 arranged between coils are formed in curved surfaces having arcuate cross-sections and formed in close contact with the outer peripheral surfaces of the inner legs 23, 33 of the cores 21, 31, respectively. Thus, the sheet-like magnetic bodies 50, 51, 52, 53 are arranged only at portions overlapping the coupled core member 20 when seen in the direction of the central axis O.

The first sheet-like magnetic bodies 50, 51 and the second sheet-like magnetic bodies 52, 53 are separated at the mid-portion of the coupled core member 20 in the length direction L across the one inner leg 23 (or 33) of the two inner legs 23, 33.

The portions 56, 57 arranged between coils of the sheet-like magnetic bodies 50, 51, 52, 53 block the coil channels 45, 46 at portions between openings on both ends of the coil channels 45, 46 when seen in the direction of the central axis O. The portions 56, 57 arranged between coils are arranged only at a part of the portion between openings on both ends of the coil channels 45, 46. In the radial direction of an arc about the central axis O, a length CL is defined as a length of the portions 56, 57 arranged between coils in the circumferential direction about the central axis O at the mid-position of the widths of the coil channels 45, 46. The length CL in the circumferential direction is smaller than a length Ca in the circumferential direction between the openings on both ends of the coil channels 45, 46 at the mid-position of the widths of the coil channels 45, 46. Alternatively, the portions 56, 57 arranged between coils may be arranged over the entire length Ca in the circumferential direction of the coil channels 45, 46, such that the length CL in the circumferential direction becomes equal to the length Ca in the circumferential direction.

The first and second coils 60, 61 have two turn portions T1, T2. The turn portions T1, T2 are formed in a substantially circular shape and have rectangular cross-sections. The coils 60, 61 are formed by connecting one end of each of the turn portions T1, T2 in the circumferential direction. The first and second coils 60, 61 are formed to be wound two turns, with both coils being overlapped with each other when seen in the axial direction. The coils 60, 61 are wound around the inner legs 23, 33 of the cores 21, 31, respectively, through the coil channels 45, 46. The first and second coils 60, 61 are arranged to be wound in the same winding direction, but the coils may also be wound in opposite directions.

Further, the first and second coils 60 and 61 are overlapped alternately and wound in the lap-winding manner in the coil channels 45, 46 when seen in the direction of the central axis O. The portions 56, 57 arranged between coils of the sheet-like magnetic bodies 50, 51, 52, 53 are arranged between the turn portions T1, T2 of the coils 60, 61. The portions 56, 57 arranged between coils are put between the turn portions T1, T2 of the coils 60, 61. Alternatively, the portions 56, 57 arranged between coils may be provided away from the turn portions T1, T2.

Figure 13:
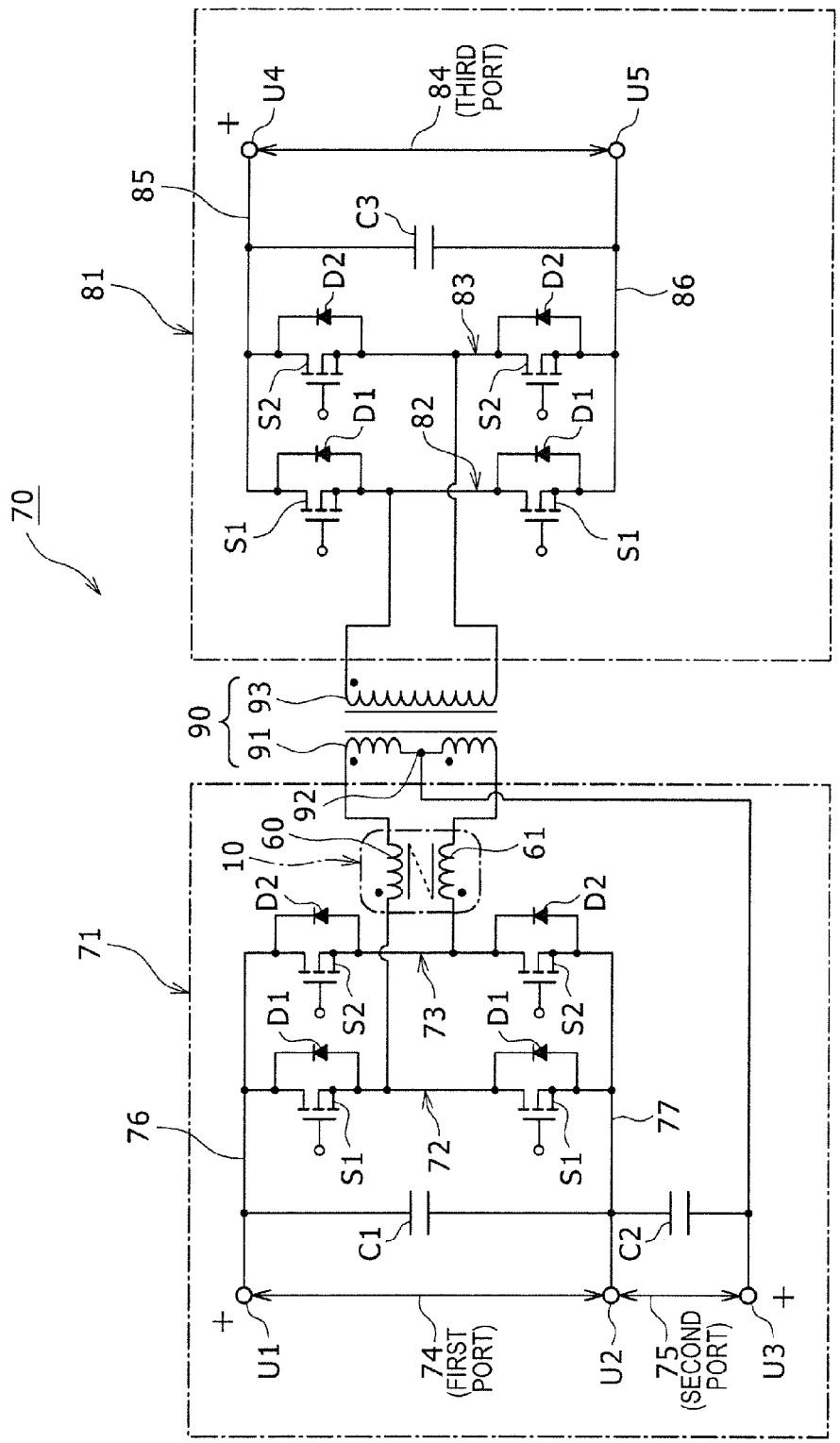
FIG. 13 is a circuit diagram illustrating a power converter in which the magnetically coupled reactor according to the embodiment of the present invention is incorporated.

The magnetically coupled reactor 10 described above may be incorporated into a power converter 70 as illustrated in FIG. 13, which will be described later, and used in a state where the current flows through the coils 60, 61 in a reverse direction (negative-phase-sequence current) or the current flows through the coils 60, 61 in the same direction (in-phase current). When the negative-phase-sequence current flows through the coils 60, 61, the magnetically coupled reactor 10 may function as a transformer and also as a reactor in terms of equivalent circuits in which the coils 60, 61 are magnetically coupled with the coupling coefficient less than 1.

In the magnetically coupled reactor 10 described above, the Joule loss can be reduced when the negative-phase-sequence current flows through the first and second coils 60, 61, because the coils 60, 61 are wound in the lap-winding manner.

Furthermore, the coupling portions 54, 55 between coils located at the outer side away from the center of the core of the sheet-like magnetic bodies 50, 51, 52, 53 are put between both ends of the first and second cores 21, 31 in the length direction L. The portions 56, 57 arranged between coils extend from the coupling portions 54, 55 between cores into the coil channels 45, 46, respectively, and are arranged between the coils 60, 61. Accordingly, magnetic resistance in the leakage flux path generated around the coils 60, 61 can be suppressed by the sheet-like magnetic bodies 50, 51, 52, 53. Thus, the leakage flux flows from the sheet-like magnetic bodies 50, 51, 52, 53 to the first core 21, the second core 31, and the intermediate core 40, for which the leakage flux interlinked with the coils 60, 61 can be decreased. It is therefore possible to further decrease the Joule loss and prevent an excessive increase of the coupling coefficient k of the magnetically coupled reactor 10.

In the present embodiment, the Joule loss and the coupling coefficient k can be further decreased compared to the structure where the sheet-like magnetic bodies 50, 51, 52, 53 are arranged in a non-contact manner by providing a gap in the first and second cores 21, 31. In addition, there is no need to use expensive Litz wires to decrease the Joule loss. The magnetically coupled reactor 10 having a desired characteristic can therefore be achieved at low cost. Only one, two, or three sheet-like magnetic bodies 50, 51, 52, 53 may be used.

As will be described later, the power converter 70 with the magnetically coupled reactor 10 incorporated therein can improve voltage conversion efficiency. As the Joule loss is decreased, an operating frequency of the power converter 70 can be easily increased. Further, a decrease of the self-inductance of the magnetically coupled reactor 10 can be suppressed, while the space between the first and second coils 60, 61 does not have to be increased excessively to reduce the Joule loss. Unlike the structure disclosed in JP 2009-284647 A, it is not necessary to provide stretched windings to be wound around two cores spaced apart from each other in a direction orthogonal to the axial direction of the coils. Accordingly, the size of the magnetically coupled reactor 10 can be decreased and it is possible to provide a smaller power converter 70. An excessive increase of the size of the power converter 70 can therefore be prevented.

Figure 4:
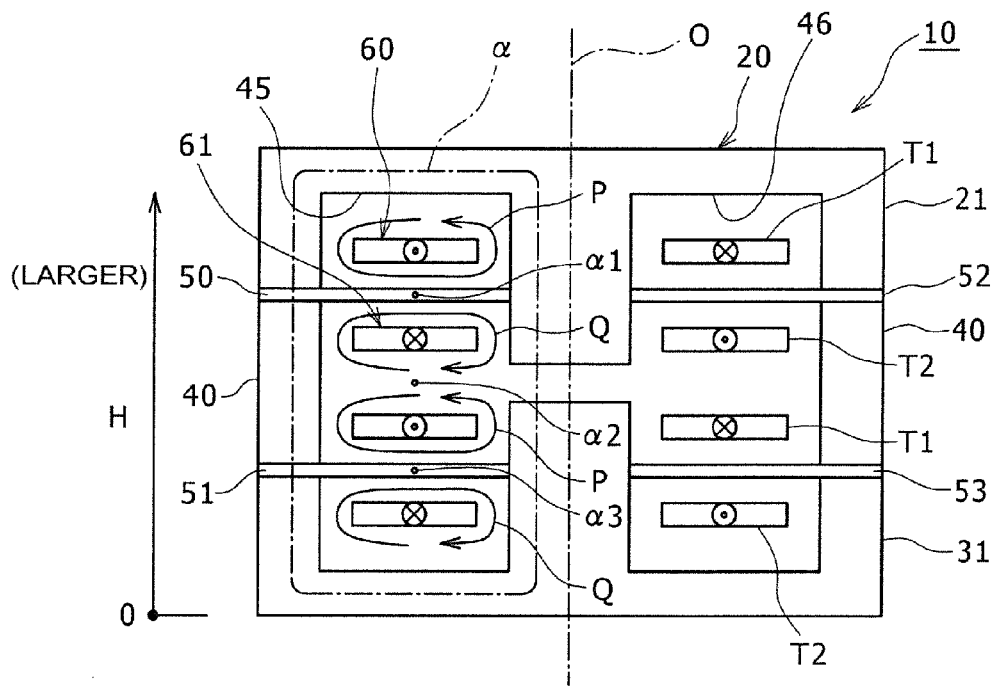
FIG. 4 is a schematic view illustrating magnetic flux paths generated around coils in FIG. 2.

Next, the Joule loss decreasing effect achieved by the lap-winding will be described. As illustrated in FIG. 4, when the negative-phase-sequence current flows in the first and second coils 60, 61, the magnetic flux is generated as indicated by arrows P, Q around the turn portions T1, T2, respectively, of the coils 60, 61. In FIG. 4, a circle with a dot in the middle indicates a current flow on the front side of FIG. 4, while a circle with "x" indicates a current flow on the back side of FIG. 4. The magnetic fluxes flows opposite to each other around the turn portions T1, T2. The magnetic flux is enhanced between adjacent turn portions T1, T2 when the magnetic flux flows in the same direction, but the enhanced magnetic flux density of the flux is not excessively increased.

Figure 5:
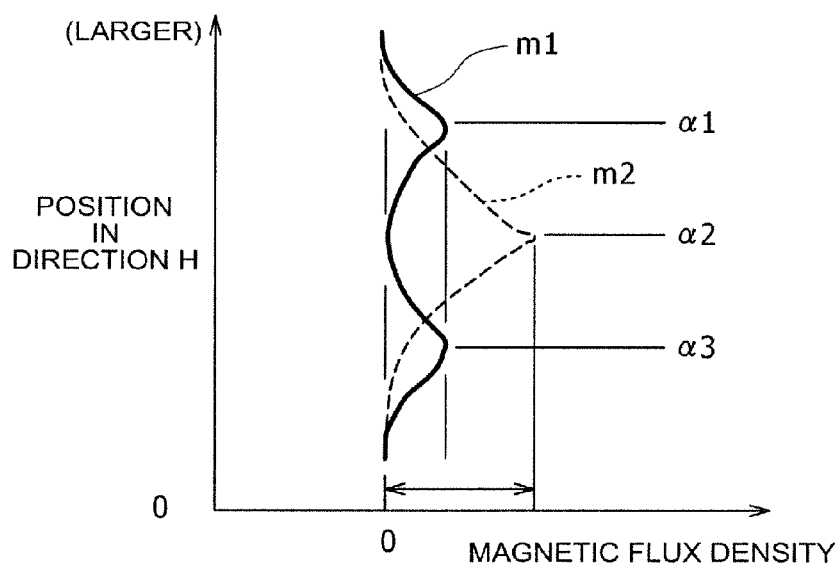
FIG. 5 illustrates a relationship of magnetic flux density generated around the coils and positions of a coupled core member in a height direction (H) at portions α in FIG. 4 when sheet-like magnetic bodies are omitted.

FIG. 5 illustrates a relationship of magnetic flux density generating around the coils 60, 61 and positions of the coupled core member 20 in the height direction (direction H) at portions α of FIG. 4. In FIG. 5, a solid line m1 indicates the density of the magnetic flux generated in the case where the sheet-like magnetic bodies 50, 51, 52, 53 are omitted in FIG. 4. α1, α2, and α3 indicated in the height direction H of FIG. 5 correspond to positions α1, α2, and α3 between the turn portions T1, T2 of FIG. 4. As illustrated in FIG. 5, the magnetic flux density increases at α1 and α3, but only to a limited extent.

Figure 6:
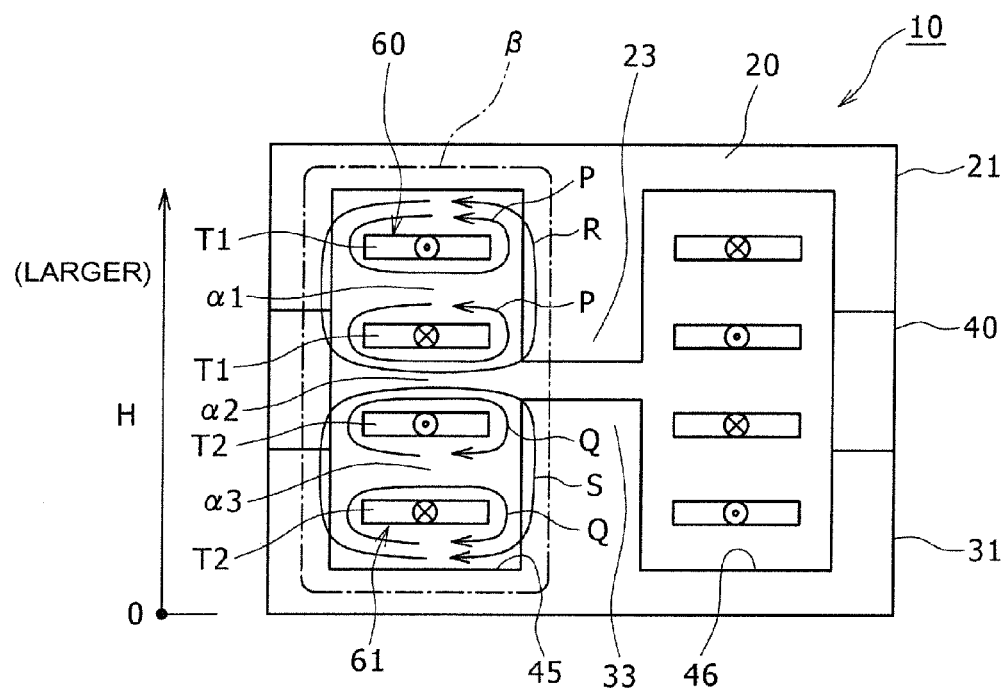
FIG. 6 illustrates a comparative example of the magnetically coupled reactor corresponding to FIG. 4.

FIG. 6 illustrates a comparative example of the magnetically coupled reactor 10 corresponding to FIG. 4. In the comparative example, the sheet-like magnetic bodies are omitted from the structure illustrated in FIG. 4. The first coil 60 is wound around the inner leg 23, which is illustrated on the upper part of FIG. 2, through the coil channels 45, 46. The second coil 61 is wound around the inner leg 33, which is illustrated on the lower part of FIG. 2, through the coil channels 45, 46. The coils 60, 61 are therefore not arranged in the lap-winding manner and are arranged separately on both sides in the height direction H.

In FIG. 6, when the negative-phase-sequence current flows through the first and second coils 60, 61, the magnetic flux indicated by P flows in the same direction at the first turn portions T1 and the magnetic flux indicated by Q flows in the same direction at the second turn portions T2 in the first and second coils 60, 61. Thus, the magnet flux is offset at the opposite positions of the turn portions T1, T2. Meanwhile, the magnetic fluxes flowing in the P and Q directions at two turn portions T1, T2, respectively, become the large magnetic flux in the R and S directions, respectively, and intensify each other at a position, α2, between the first and second coils 60, 61.

In FIG. 5, a broken line m2 indicates the magnetic flux density of the comparative example of FIG. 6. In the comparative example illustrated in FIG. 5, as the maximum value of the magnetic flux density becomes larger than that of the embodiment, the magnetic flux interlinked with the coils 60, 61 may become large. As a result of this, the Joule loss might increase in the comparative example. In the present embodiment, such a disadvantage can be prevented because the coils 60, 61 are arranged in the lap-winding manner and the Joule loss can be decreased.

Figure 7:
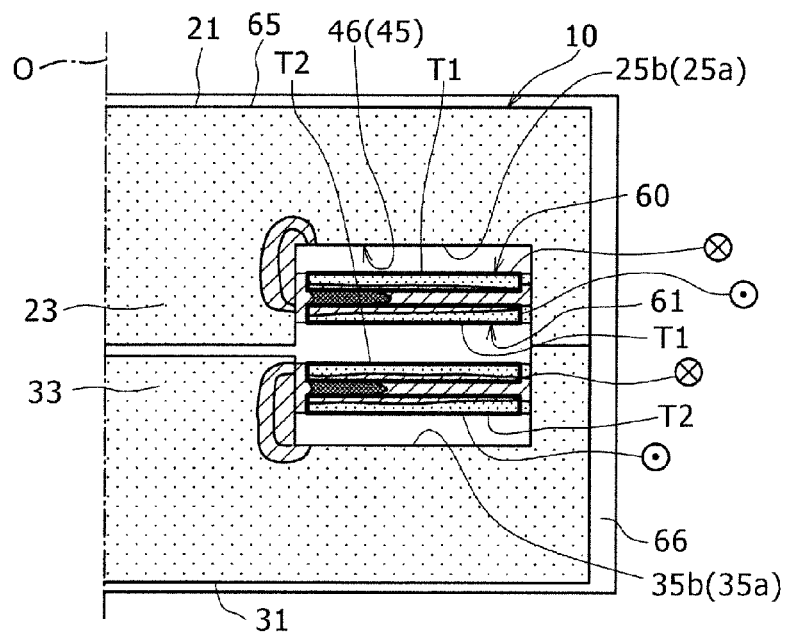
FIG. 7 illustrates a simulation result of a magnetic flux distribution when a negative-phase-sequence current flows through the coils in the magnetically coupled reactor having the first and second coils wound around cores in a lap-winding manner.
Figure 8:
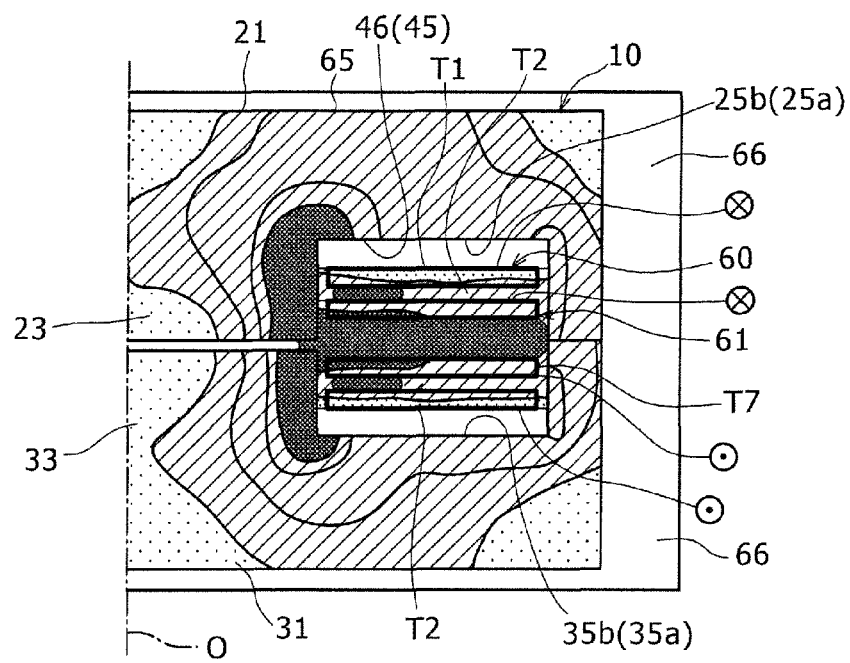
FIG. 8 illustrates a simulation result of the magnetic flux distribution when the negative-phase-sequence current flows through the coils in the magnetically coupled reactor having the first and second coils arranged separately on both sides in the axial direction.

FIGS. 7 and 8 illustrate simulation results to confirm the effect of winding the first and second coils 60, 61 in the lap-winding manner. FIG. 7 illustrates a simulation result of the magnetic flux distribution when the negative-phase-sequence current flows in the coils 60, 61 in the magnetically coupled reactor 10 in which the first and second coils 60, 61 are wound around the core 65 in the lap-winding manner. FIG. 8 illustrates a simulation result of the magnetic flux density when the negative-phase-sequence current flows in the coils 60, 61 in the magnetically coupled reactor 10 in which the first and second coils 60, 61 are arranged separately on both sides in the axial direction. In the simulation models illustrated in FIGS. 7 and 8, the first and second cores 21, 31 are coupled in the axial direction (vertical direction in FIGS. 7 and 8) to form the core 65. In the core 65, the recesses 25a, 25b formed in the first core 21 and the recesses 35a, 35b formed in the second core 31 are arranged to face each other. Accordingly, the two arcuate coil channels 45, 46 are formed in the core 65. The first and second coils 60, 61 pass through the coil channels 45, 46 and are wound around the inner legs 23, 33 of the core 65. The first and second coils 60, 61 are arranged in the lap-winding manner. Space 66 is formed around the core 65. To focus on the effect of the lap-winding, the intermediate core 40 and the sheet-like magnetic body 50 (FIGS. 1 and 2) have been omitted in the simulation models of FIGS. 7 and 8. In FIGS.

7 and 8, only one side of the plane including the central axis O is illustrated. Also, in FIGS. 7 and 8, the smallest magnetic flux density is indicated by blank portions, and the magnetic flux density increases as indicated by dots, shading, and mostly black slanted lattice portions, in this order. The largest magnetic flux density is indicated by mostly black. In FIGS. 7 and 8, a circle with a dot in the middle and circles with "x" in the middle are illustrated externally to the core 65, and the meanings of these circles are the same as those in FIG. 4.

As illustrated in FIG. 7, when the coils 60, 61 are arranged in the lap-winding manner as in the present embodiment, a high magnetic flux density is attained only in limited areas. Meanwhile, as illustrated in FIG. 8, when the cores 60, 61 are arranged separately on both sides in the axial direction of the core 65 as in the comparative example of FIG. 6, the high magnetic flux density is attained in many areas. The effect of the present embodiment can be confirmed according to the simulation results of FIGS. 7 and 8.

In the present embodiment, the sheet-like magnetic bodies 51, 52, 53, 54 are separately arranged by the first sheet-like magnetic bodies 51, 52 and the second sheet-like magnetic bodies 53, 54 on both sides in the length direction L. It is not necessary therefore to integrally connect two sheet-like magnetic bodies arranged on both sides in the length direction L via the gap between the first and second cores 21, 31. The gap G1 (FIG. 2) between the cores 21, 31 can be made smaller, which increases the degree of freedom of changing the gap G1. Therefore, the magnetically coupled reactor 10 having a desired characteristic can easily be achieved.

In addition, the sheet-like magnetic bodies 50, 51, 52, 53 are arranged only at portions overlapping the coupled core member 20 when seen in the direction of the central axis O. The sheet-like magnetic bodies 50, 51, 52, 53 are not arranged at portions, external to the coupled core member 20, where only a small effect of decreasing the Joule loss is provided. Therefore, the Joule loss can be decreased more efficiently.

Further, the sheet-like magnetic bodies 50, 51, 52, 53 block the portions between openings at both ends of the coil channels 45, 46 when seen in the direction of the central axis O by abutting the tip ends on the outer peripheral surface of the inner leg 23. A lot of the leakage magnetic flux therefore flows through the first core 21, the intermediate core 40, and the second core 31 through the sheet-like magnetic bodies 50, 51, 52, 53. It is therefore possible to suppress the leakage flux from largely swelling in the space of the coil channels 45, 46, and further decrease the coupling coefficient k.

The coupling coefficient k of the magnetically coupled reactor 10 is highly sensitive to the change of the circumferential length C1 of the portion 56 between coils of the sheet-like magnetic bodies 50, 51, 52, 53. It is therefore possible to easily adjust the coupling coefficient k by adjusting the circumferential length CL. The tip ends of the sheet-like magnetic bodies 50, 51, 52, 53 can also be arranged to face each other at a gap on the outer peripheral surface of the inner leg 23. Even when the gap is provided between the sheet-like magnetic bodies 50, 51, 52, 53 and the inner leg 23, as the circumferential length CL increases, the coupling coefficient k can be decreased, but the sensitivity of the coupling coefficient k decreases.

Figure 9:
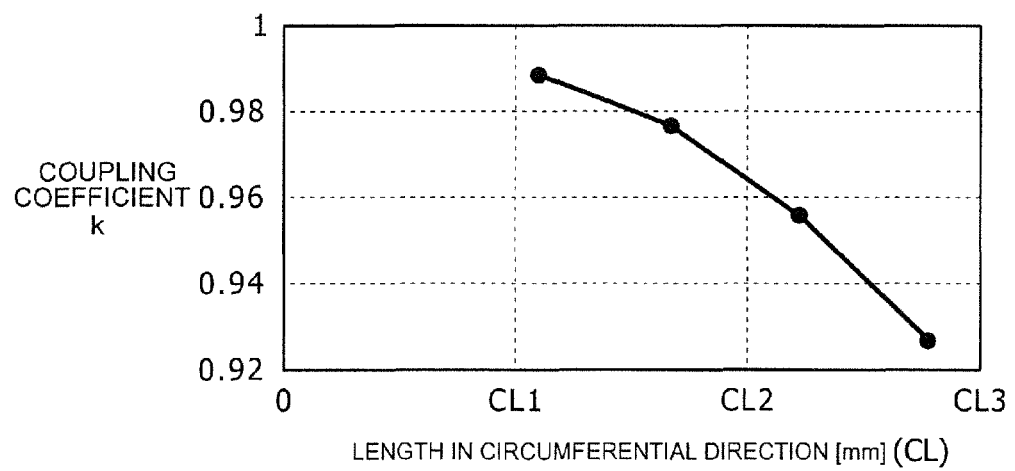
FIG. 9 illustrates a relationship of a coupling coefficient k of each coil and a length CL in a circumferential direction at the center position of a portion arranged between coils of the sheet-like magnetic body when the negative-phase-sequence current flows through the coils in the magnetically coupled reactor according to the embodiment of present invention.
Figure 10:
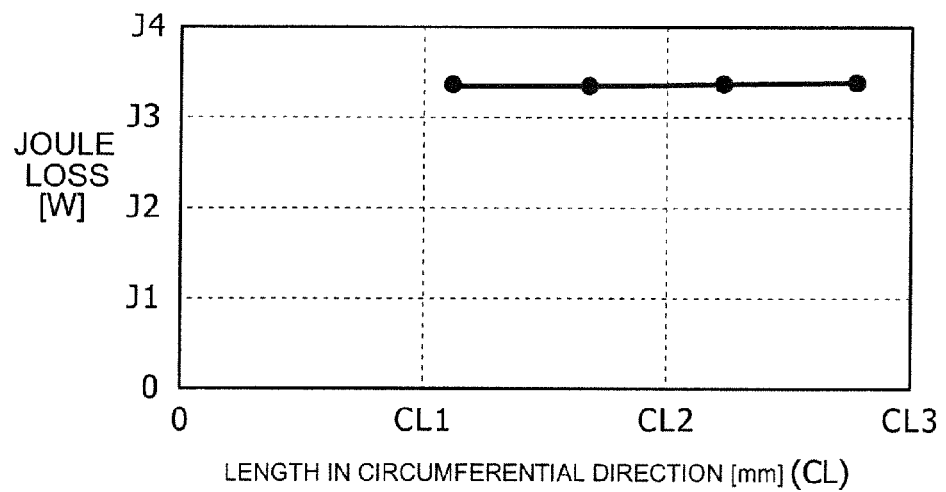
FIG. 10 illustrates a relationship of Joule loss of each coil and the length CL in a circumferential direction at the center position of the portion arranged between coils of the sheet-like magnetic body when the negative-phase-sequence current flows through the coils in the magnetically coupled reactor according to the embodiment of present invention.
Figure 11:
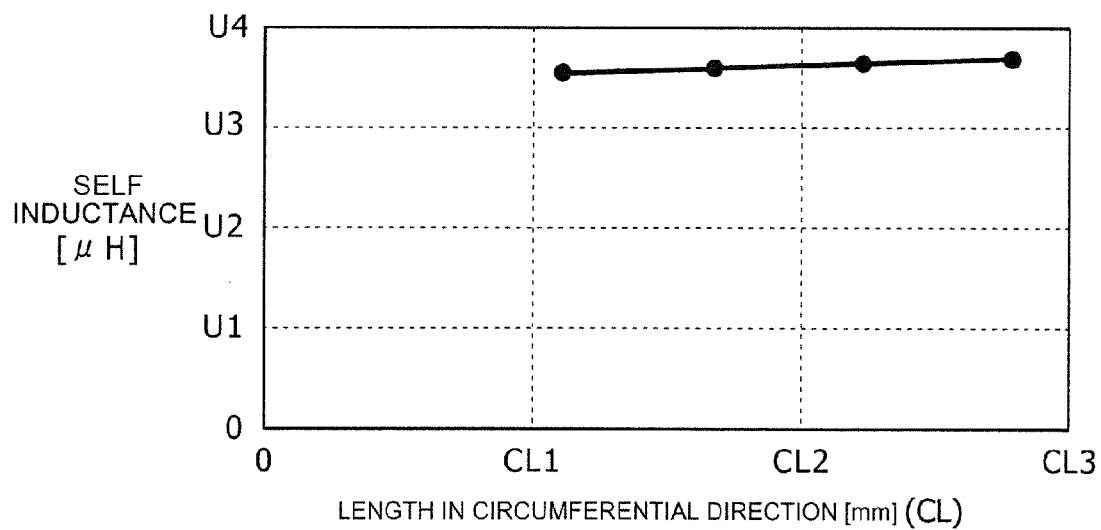
FIG. 11 illustrates a relationship of self-inductance of each coil and the length CL in a circumferential direction at the center position of the portion arranged between coils of the sheet-like magnetic body when the negative-phase-sequence current flows through the coils in the magnetically coupled reactor according to the embodiment of present invention.

FIGS. 9 to 11 illustrate the circumferential length CL of the portions 56, 57 between coils relative to the coupling coefficient k, the Joule loss, and the self-inductance of the coils 60, 61, respectively, when the negative-phase-sequence current flows through the coils 60, 61. It is assumed that the circumferential length CL is the same for the portions 56 and 57 and is changed simultaneously. In FIGS. 9 to 11, the circumferential length CL1, CL2, and CL3 indicate the same values, respectively. For example, when the length CL is the entire length in the circumferential direction about the central axis O, CL1 to CL3 may be about $\frac{1}{100}$th to $\frac{3}{100}$th of the entire length. As illustrated in FIG. 9, as the circumferential length CL is increased, the coupling coefficient k is largely decreased from a value near 0.99 to a value near 0.92. Meanwhile, as illustrated in FIG. 10, almost no change has been indicated for the Joule loss even when the circumferential length CL is changed. As to the self-inductance as illustrated in FIG. 11, the self-inductance gradually increases as the circumferential length CL is increased, but the degree of the increase is very small.

Figure 12:
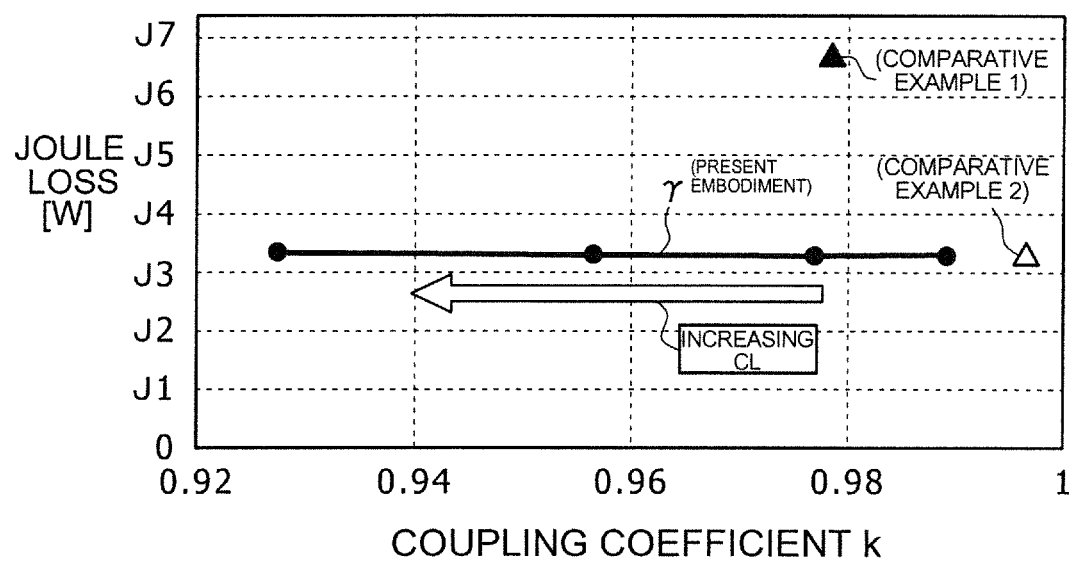
FIG. 12 illustrates a relationship of the coupling coefficient k and the Joule loss J when the negative-phase-sequence current flows through the coils in the magnetically coupled reactor according to the embodiment of the present invention.

In FIG. 12, a solid line γ indicates a relationship of the coupling coefficient k and the Joule loss, which has been determined according to the relationships illustrated in FIGS. 9 and 10. As can be seen from FIG. 12, the Joule loss changes little although the coupling coefficient k is changed. In FIG. 12, the comparative example 1 is represented by a black triangle, and the comparative example 2 is represented by a white triangle. In the comparative example 1, the first and second coils 60, 61 are separately wound on both sides of the coupled core member 20, as in the embodiment illustrated in FIGS. 1 to 3. In the comparative example 2, the sheet-like magnetic bodies have been omitted, similar to the structure of the present embodiment. In the comparative example 1, the Joule loss has been largely increased compared to the embodiment. In the comparative example 2, the Joule loss has been lowered compared to the comparative example 1, but the coupling coefficient k remains high at a fixed value. In the embodiment, the Joule loss can be lowered compared to the comparative example 1, and the coupling coefficient k can be largely decreased in accordance with the increase of the circumferential length CL of the sheet-like magnetic bodies 50, 51, 52, 53.

FIG. 13 is a circuit diagram of the three-port-type power converter 70 in which the magnetically coupled reactor 10 of the present embodiment is incorporated. The power converter 70 includes a primary circuit 71 and a secondary circuit 81. The secondary circuit 81 is magnetically coupled with the primary circuit 71 via a voltage converter 90.

The primary circuit 71 includes first and second arms 72 and 73 that are connected in parallel with each other, first and second ports 74 and 75, and a magnetically coupled reactor 10.

The first arm 72 includes two first switching elements S1 connected in series with each other, and first diodes D1 connected in parallel with the first switching elements S1. The second arm 73 includes two second switching elements S2 connected in series with each other, and second diodes D2 connected in parallel with the second switching elements S2.

The first and second arms 72 and 73 are connected between a first positive bus 76 and a negative bus 77. The switching elements S1, S2 are metal-oxide-semiconductor field-effect transistors (MOSFET). The switching elements S1, S2 may be constituted of other transistors, such as insulated-gate bipolar transistors (IGBT).

A first port 74 is provided between the first positive bus 76 and the negative bus 77. The first port 74 has first and second terminals U1, U2. A second port 75 is provided between a center tap 92, which is a middle point of a first voltage converting coil 91 that constitutes a voltage converter 90, and the negative bus 77. The second port 75 has second and third terminals U2, U3.

Capacitors C1, C2 are connected between the first positive bus 76 and the negative bus 77, and between the center tap 92 of the first voltage converting coil 91 and the negative bus 77, respectively.

One end of the first coil 60 of the magnetically coupled reactor 10 is connected between the two first switching elements S1 of the first arm 72. One end of the second coil 61 of the magnetically coupled reactor 10 is connected between the two second switching elements S2 of the second arm 73.

The voltage converter 90 includes first and second voltage converting coils 91, 93. The first and second voltage converting coils 91, 93 are magnetically coupled with each other. Other ends of the first and second coils 60, 61 of the magnetically coupled reactor 10 are connected to both ends of the first voltage converting coil 91.

The secondary circuit 81 includes third and fourth arms 82, 83 that are connected in parallel with each other, and a third port 84. The third and fourth arms 82, 83 are constituted similarly to the first and second arms 72, 73.

The third port 84 is provided between a second positive bus 85 and a second negative bus 86. The third port 84 has fourth and fifth terminals U4 and U5. A capacitor C3 is connected between the second positive bus 85 and the second negative bus 86.

One end of the second voltage converting coil 93 of the voltage converter 90 is connected between the two first switching elements S1 of the third arm 82. The other end of the second voltage converting coil 93 is connected between the two switching elements S2 of the fourth arm 83.

Switching of the switching elements 51, S2 of the arms 72, 73, 82, 83 is controlled by a controller which is not illustrated. In the arms 72, 73, 82, 83, the two switching elements S1 (or S2) are subjected to switching operations in a state where the phases are different at 180 degrees each other.

The controller selects a mode from a plurality of modes in accordance with an entered external signal. According to the mode selection, the controller determines an input-side port and an output-side port from three ports 74, 75, 84. The controller then changes, depending on the selected mode, at least one of the phase difference between the switching elements S1, S2 among the arms 72, 73, 82, 83 and turn-on time of the switching elements S1, S2.

In such a power converter 70, bidirectional transmission of power is available between the selected two ports among the ports 74, 75, 84. Also, the power converter 70 can simultaneously execute an insulation-type power converting operation and a non-insulation-type power converting operation. The power converter 70 can also switch the executed operation to the non-insulation-type power converting operation.

Figure 14A:
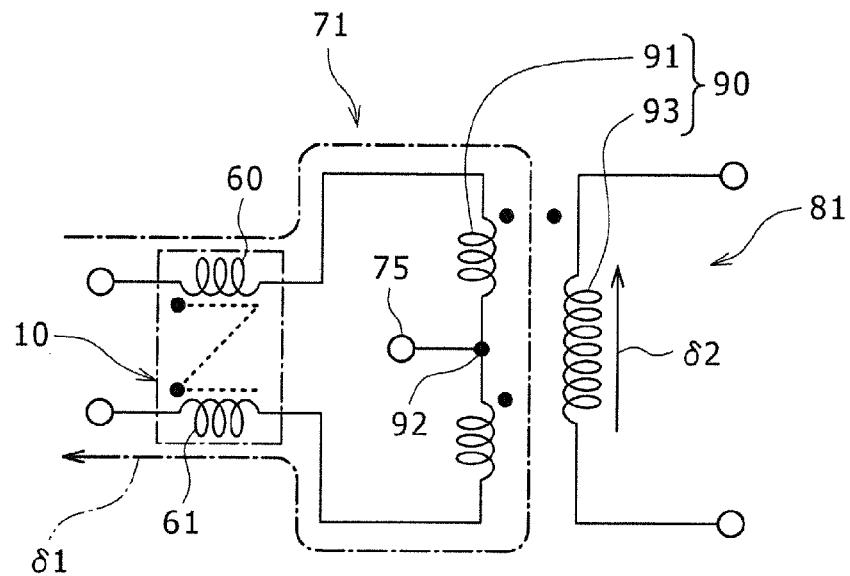
FIG. 14A illustrates a direction of the current flow in the magnetically coupled reactor when an insulation-type voltage converting operation is performed in the power converter of FIG. 13.

In the insulation-type power converting operation, the power converter 70 transmits power while performing the voltage converting operation between the first or second port 74, 75 and the third port 84. For example, the first port 74 may be on the input side and the third port may be on the output port. In such a voltage converting operation, as indicated by an arrow $\delta 1$ of a dash-dot line of FIG. 14A, the negative-phase-sequence current that flows in a reverse direction may flow in the first and second coils 60, 61 of the magnetically coupled reactor 10. In the secondary circuit 81, the second voltage converting coil 93 is excited by the current flowing through the first voltage converting coil 91 to allow current flow in a direction indicated by an arrow $\delta 2$ of a solid line.

In the design of an insulation-type converter, an inductance component having an appropriately small value is needed to work against the negative-phase-sequence current. When the negative-phase-sequence current flows in the first and second coils 60, 61, the magnetic flux is intensified only at a portion where the coils 60, 61 face each other, as described in connection with FIG. 4. Meanwhile, the magnetic flux is attenuated around the coils 60, 61 as a whole. Accordingly, the power transmission operation can be performed using the leakage inductance component alone, while suppressing the increase of the loss of the power converter 70. If, however, the coupling coefficient k is excessively high, the leakage inductance component becomes extremely small, and a necessary inductance value required in the design cannot be obtained. In the present embodiment, since the coupling coefficient k can be low, while suppressing the increase of the loss due to the interlinking of the magnetic flux to a conductor, the power converter 70 can efficiently perform the power transmission operation using the leakage inductance component. The power converter 70 can therefore achieve a desired performance.

Figure 14B:
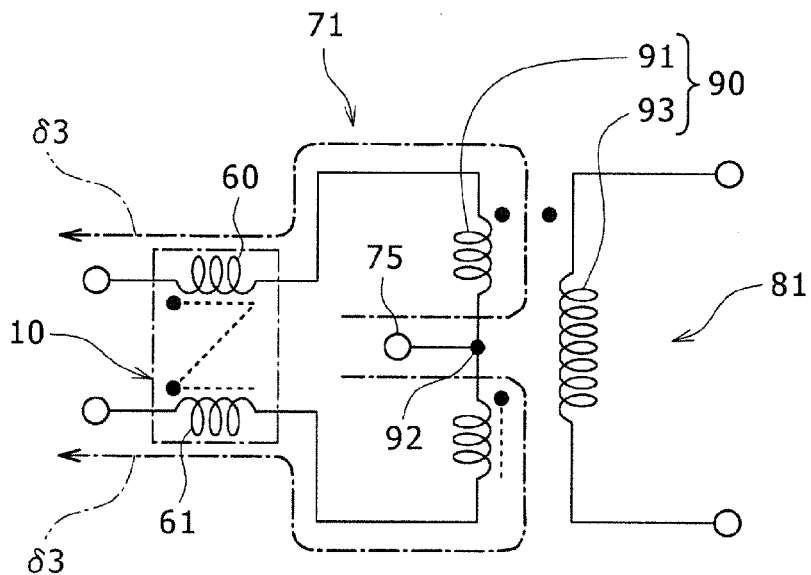
FIG. 14B illustrates a direction of the current flow in the magnetically coupled reactor when a non-insulation-type voltage converting operation is performed in the power converter of FIG. 13.

In the non-insulation-type voltage converting operation, the power converter 70 transmits power while converting the voltage between the first and second ports 74, 75. For example, the second port 75 may be on the input side and the first port may be on the output side. In such a voltage converting operation, as indicated by an arrow $\delta 3$ of a dash-dot line of FIG. 14B, the in-phase current that flows in the same direction flows between the first and second coils 60, 61. The magnetic flux is then attenuated between the first and second coils 60, 61, while the magnetic flux is intensified around the coils as a whole. Accordingly, in the magnetically coupled reactor 10, the voltage converting operation can be performed using a sum of the leakage inductance component and the excited inductance component.

The magnetically coupled reactor 10 having been incorporated in the primary circuit 71 of the three-port-type power converter 70 has been described in the above, but the magnetically coupled reactor 10 may also be incorporated in the secondary circuit 81. The secondary circuit 81 can be formed similarly to the primary circuit 71. The magnetically coupled reactor 10 may be used in a two-port or four-port type power converter 70.

Figure 15:
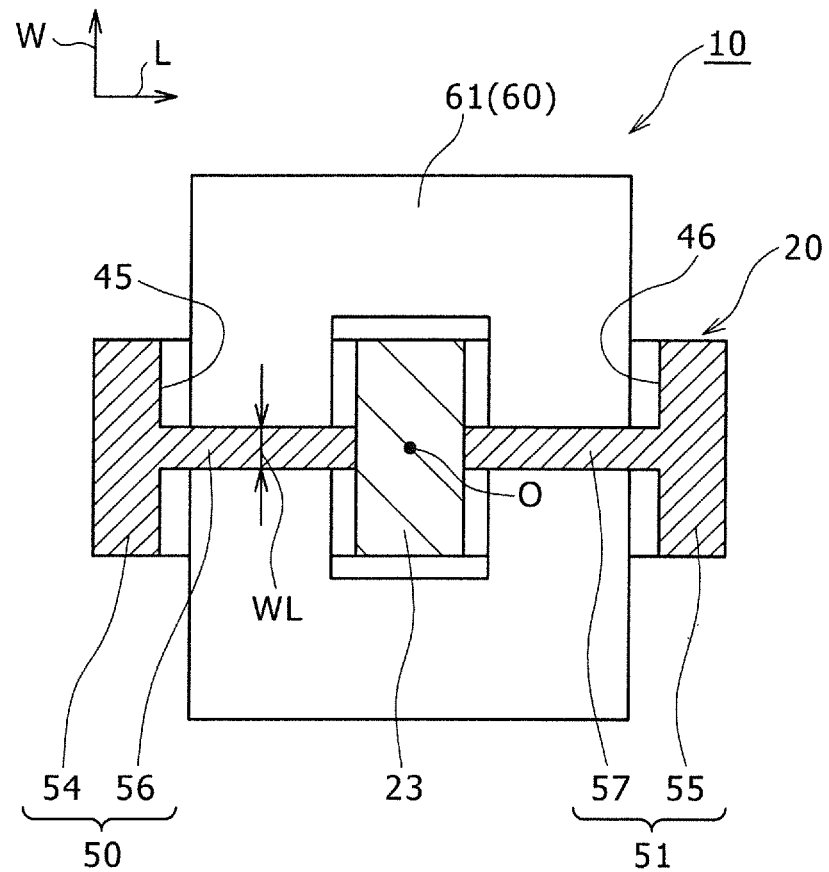
FIG. 15 is a first alternative example of the magnetically coupled reactor corresponding to FIG. 3 according to another embodiment of the present invention.

FIG. 15 illustrates a first alternative example of the magnetically coupled reactor 10 according to the embodiment of the present invention. In the structure of this example, the coupled core member 20 is in a rectangular shape when seen in the direction of the central axis O. In the coupled core member 20, the first and second coil channels 45, 46 are formed in parallel with each other and having a rectangular cross section. The first and second coils 60, 61 are formed in a rectangular shape when seen in the direction along the central axis O. Sheet-like magnetic bodies 50, 51 include rectangular portions 56, 57 arranged between coils and protruding from rectangular coupling portions 54, 55 between cores toward the coil channels 45, 46. The portions 56, 57 arranged between coils are provided between the first and second coils 60, 61 in the coil channels 45, 46, respectively.

In the structure of this example, the coupling coefficient k of the magnetically coupled reactor 10 can be adjusted by changing a length WL of the portions 56, 57 arranged between coils in a width direction W. Other portions of the structure and the effect thereof are similar to those of FIGS. 1 to 4 and FIG. 13.

Figure 16A:
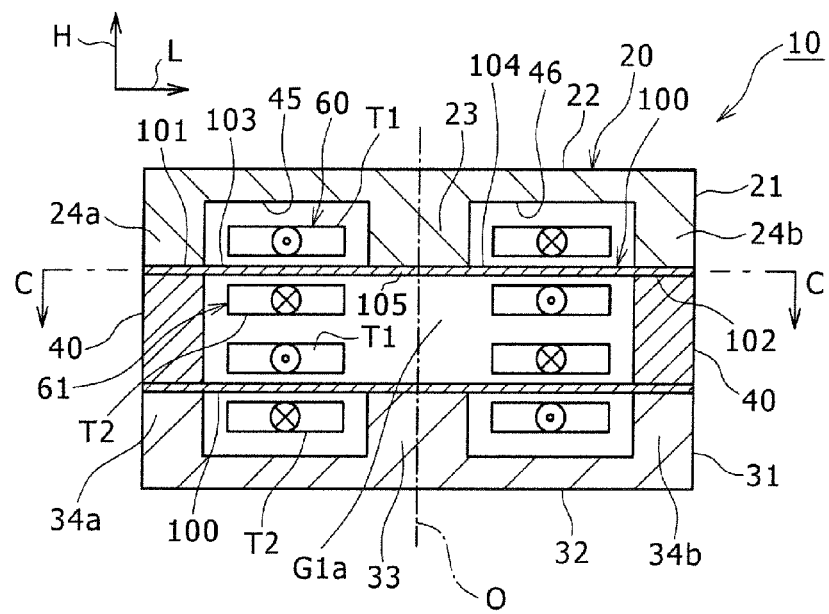
FIG. 16A is a second alternative example of the magnetically coupled reactor corresponding to FIG. 4 according to another embodiment of the present invention.
Figure 16B:
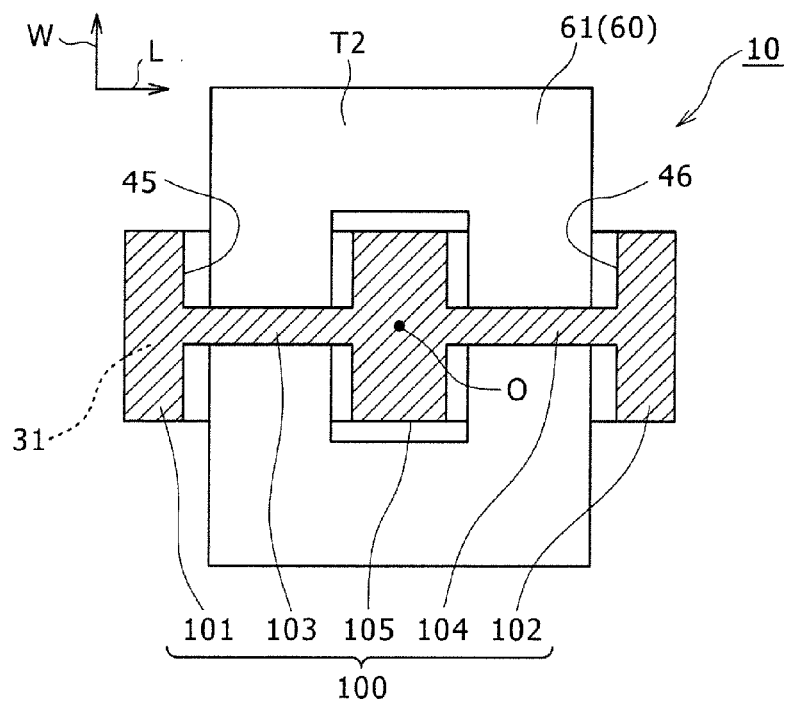
FIG. 16B is a cross-sectional view cut along line C-C of FIG. 16A.

FIG. 16A is a second alternative example of the magnetically coupled reactor 10, which corresponds to FIG. 4, according to the embodiment of the present invention. FIG. 16B is a cross-sectional view of FIG. 16A cut along line C-C. Similar to the structure of FIG. 15, this structure also includes a coupled core member 20 and first and second coils 60, 61 formed in rectangular shapes when seen in the direction of the central axis O. Inner legs 23, 33 of the first and second cores 21, 31 of the coupled core member 20 are formed to have the same length as the end legs 24a, 24b, 34a, 34b. Accordingly, a large gap G1a having a larger height than in the structure of FIG. 4 in the height direction H between tip ends of the inner legs 23, 33 is formed.

The coupled core member 20 includes two sheet-like magnetic bodies 100 arranged separately in the height direction H. The sheet-like magnetic bodies 100 include first and second coupling portions 101, 102 between cores, first and second portions 103, 104 arranged between coils, and an intermediate connecting portion 105.

The first coupling portion 101 between cores is put between one end (leftmost ends of FIGS. 16A and 16B) in the length direction L, which is the outer portion formed by the outer end legs 24a, 34a, in the first and second cores 21, 31. The second coupling portion 102 between cores is put between the other ends (rightmost ends of FIGS. 16A and 16B) in the length direction L, which is the second outer portion formed by the second outer end legs 24b, 34b, in the first and second cores 21, 31. A first portion 103 between coils extends into the first coil channel 45 from the first coupling portion 101 between cores and is arranged between the turn portions T1, T2 of the first and second coils 60, 61 in the direction of the central axis O. A second portion 104 between coils extends into the second coil channel 46 from the second coupling portion 102 between cores and is arranged between the turn portions T1, T2 of the first and second coils 60, 61 in the direction of the central axis O.

The intermediate connecting portion 105 couples the first and second portions 103, 104 arranged between coils. The intermediate connecting portion 105 has a rectangular cross-section similar to the cross-section of the inner leg 23. Also, the intermediate connecting portion 105 is overlapped on the tip ends of the inner legs 23, 33 of the first and second cores 21, 31, and arranged in the gap between the tip ends of the inner legs 23, 33 of the first and second cores 21, 31.

In the structure of this example, since the number of the sheet-like magnetic bodies 100 can be decreased, the incorporating time and labor can be reduced. Other portions of the structure and the effect thereof are similar to those of the structure of FIGS. 1 to 4 and FIG. 13, or FIG. 15.

In the above examples, the first and second coils 60, 61 may not be perfectly overlapped with each other when seen in the direction of the central axis O. For example, in the structure illustrated in FIGS. 16A and 16B, the length of the first coil 60 in the width direction W may be made to be larger than length of the second coil 61 in the width direction W. In this structure, the first and second coils 60, 61 are also overlapped alternately in the coil channels 45, 46. In the above examples, two channels 45, 46 have been formed in the coupled core member 20, but only one coil channel may be formed. For example, in first and second cores 21, 31 of the structure of FIG. 2, the right half of the structure may be omitted such that the coupled core member is in a substantially rectangular shape when seen in the direction of FIG. 2. In this structure, two end legs corresponding to the outer end legs 24a, 34a and the inner legs 23, 33 are formed at both ends on the side facing the cores 21, 31. Portions corresponding to the second outer end legs 24b, 34b and the other (right side of FIG. 2) intermediate core 40 can be omitted. The coil channels are formed in the first and second cores 21, 31 by the recesses 25a, 35a between the end portions. The first and second coils 60, 61 are wound around the inner legs 23, 33. In this structure, the second sheet-like magnetic bodies 52, 53 are omitted. With such a structure, an excessive increase of the size can also be prevented, the Joule loss can be decreased when the reverse-phase-sequence current flows through the coils 60, 61, and the excessive increase of the coupling coefficient can be prevented.

What is claimed is:

1. A magnetically coupled reactor, comprising:
   a coupled core member; and
   a first coil and a second coil,
   the coupled core member including
   a first core and a second core made of magnetic materials and arranged to face each other,
   a coil channel formed by a recess formed between two legs on a side facing the first core and the second core, and
   a sheet-like magnetic body by which a coupling portion between cores is put between the first core and the second core on a peripheral side at an outer portion formed by one of the two legs,
   the first coil and the second coil passing through the coil channel and being wound around the other of the two legs and being overlapped alternately in the coil channel when seen in an axial direction, wherein
   the sheet-like magnetic body has a portion arranged between coils that extends from the coupling portion between cores into the coil channel and is arranged between the first and second coils in the axial direction.

2. The magnetically coupled reactor according to claim 1, wherein
   the coupled core member includes
   an outer leg configured as one of the two legs,
   an inner leg configured as the other of the two legs,
   a second coil channel formed by a second recess formed between the inner leg and a second outer leg on a side facing the first core and the second core, and
   a second sheet-like magnetic body by which a second coupling portion between cores is put between the first core and the second core on a peripheral side at a second outer portion formed by the second outer leg,
   the first coil and the second coil pass through the coil channel and the second coil channel, respectively, and are wound around the inner leg, and
   the second sheet-like magnetic body includes a second portion arranged between coils that extends from the second coupling portion between cores into the second coil channel and is arranged between the first coil and the second coil in the axial direction.

3. The magnetically coupled reactor according to claim 1, wherein
   the coupled core member includes
   an outer leg configured as one of the two legs,
   an inner leg configured as the other of the two legs,
   a second coil channel formed by a second recess formed between the inner leg and the second outer leg on a side facing the first core and the second core, and
   a second outer portion formed by the second outer leg,
   the sheet-like magnetic body includes a second coupling portion between cores put between the first core and the second core at the second outer portion, a second portion arranged between coils that extends from the second coupling portion between cores into the second coil channel and is arranged between the first coil and the second coil in the axial direction, and an intermediate connecting portion arranged in a gap between the first core and the second core to couple the portion arranged between coils and the second portion arranged between coils, and the first coil and the second coil are configured to pass through the coil channel and the second coil channel, respectively, and are wound around the inner leg.

4. The magnetically coupled reactor according to claim 1, wherein the sheet-like magnetic body is arranged only at a portion overlapping the coupled core member when seen in the axial direction.

5. The magnetically coupled reactor according to claim 4, wherein the sheet-like magnetic body blocks a portion between openings at both ends of the coil channel when seen in the axial direction.

6. The magnetically coupled reactor according to claim 5, wherein the sheet-like magnetic body is arranged only at a portion between the openings at both ends of the coil channel when seen in the axial direction.

7. A power converter comprising:

a primary circuit; and a secondary circuit magnetically coupled to the primary circuit via a voltage converter, wherein the primary circuit or the secondary circuit includes a first arm including two first switching elements connected in series with each other, a second arm including two second switching elements connected in series with each other, and a magnetically coupled reactor according to claim 1, one end of the first coil is connected between the two first switching elements in the first arm, one end of the second coil is connected between the two second switching elements in the second arm, the other ends of the first coil and the second coil are connected to both ends of a voltage converting coil that constitutes the voltage converter on the primary circuit side, and the power converter is used in a state where a negative-phase-sequence current flows through the first coil and the second coil.

\* \* \* \* \*